UNITED STATES PATENT OFFICE.

RALPH H. McKEE, OF ORONO, MAINE.

PREPARATION OF DULL-FINISH COATING MATERIALS.

1,216,338.   Specification of Letters Patent.   Patented Feb. 20, 1917.

No Drawing.   Application filed March 13, 1916. Serial No. 83,972.

*To all whom it may concern:*

Be it known that I, RALPH H. McKEE, a citizen of the United States, residing at Orono, in the county of Penobscot and State of Maine, have invented certain new and useful Improvements in the Preparation of Dull-Finish Coating Materials, of which the following is a specification.

This invention relates to methods for the preparation of products capable of imparting a so-called "dull finish" to coated papers.

It is known that certain imported and relatively expensive grades of barium sulfate (blanc fixe) impart a dull finish to coated papers. Such grades are understood to be produced in connection with special processes of making hydrogen peroxid by the decomposition of barium peroxid by sulfuric acid, and are clearly differentiated in the paper-coating art from the ordinary cheap commercial grades of blanc fixe, which is formed as a by-product in many chemical operations. This latter grade of blanc fixe if used for coating paper imparts a less desirable glossy finish thereto. The barium sulfate formed as a by-product of hydrogen peroxid manufacture by the ordinary methods belongs to the glossy-finish variety, and it is only by the use of special methods of producing hydrogen peroxid that the dull-finish variety may be prepared, such methods involving however, it is understood, a material sacrifice in the yield of hydrogen peroxid. The dull-finish variety of blanc fixe usually brings in the market approximately three times the price of the glossy-finish variety. My present invention includes a method whereby the glossy-finish or cheaper variety of blanc fixe may be transformed into the dull-finish variety. By application of the principle underlying my invention, I am also enabled to transform other compounds applicable in the paper-coating art into a modification capable of giving a dull finish. This is notably the case with respect to calcium carbonate. In all cases the transformation is accomplished without changing the chemical constitution of the coated substance.

My investigations have shown that the essential difference between the glossy-finish and the dull-finish varieties of blanc fixe, as well as between the corresponding varieties or grades of calcium carbonate, is connected with the size of the particles or crystals in the respective grades; and is due to the absence in the high-grade (dull-finish) coating product of any large proportion of relatively minute crystals. The dull-finish products consist almost entirely of relatively large and quite uniform crystals, whereas the glossy finish grade is a mixture of crystals of various sizes, including extremely minute crystals. It is to the presence of these latter that the glossy finish is to be attributed.

Referring specifically to blanc fixe, I am able to transform the glossy-finish variety into the dull-finish variety by the following treatment The ordinary blanc fixe of commerce is subjected for a sufficient time, usually several hours, to the action of concentrated sulfuric acid, at ordinary or preferably higher temperatures. The acid is then diluted with water, which is preferably added slowly, so that the dilution is accomplished gradually. The dilute acid is then separated from the barium sulfate, which will be found to have undergone a transformation into the dull-finish variety.

The principle underlying this transformation is believed to be the following:—

Contrary to the generally accepted belief, barium sulfate, although practically insoluble in dilute acids, is fairly soluble in concentrated sulfuric acid, possibly to the extent of ten to fifteen per cent., depending on concentration and temperature. It is known (Ostwald) that under otherwise identical conditions small crystals are more soluble than large crystals of the same substance. Under the conditions of treatment above described, the minute crystals which characterize the glossy-finish variety of blanc fixe are dissolved, and are re-precipitated upon such larger crystals as may be present. Thereby the minute crystals are either eliminated or greatly reduced in number, while at the same time the average size of the remaining larger crystals is further increased.

The purpose of the slow addition of water as above described is in order that every opportunity may be afforded for the dissolved barium sulfate to deposit upon the surfaces of existing crystals, instead of forming new centers of crystallization: this is however less essential than might appear, inasmuch as the tendency of the dissolved sulfate to deposit upon the already existing crystals is very strongly marked.

Having in view the foregoing explanation, it will be understood that the same principle is applicable to other compounds, by treating them with a liquid having very limited solvent powers. For example, ordinary calcium carbonate ("precipitated chalk") may be permitted to stand in an aqueous solution of carbon dioxid, with the result that the smaller particles pass into solution and precipitate upon the larger particles or crystals, thereby eliminating the former and increasing the average size of the latter.

It is not regarded as necessary in either of the foregoing cases that the precipitation should be brought about by reducing either the concentration or the temperature of the solvent; for it appears that even under substantially constant conditions there is a tendency for the very minute crystals to pass into solution, and to separate again upon the surface of the existing larger crystals.

The above principle may of course be applied in other ways. For example, calcium carbonate may be precipitated in the presence of carbon dioxid, or of a product yielding carbon dioxid under existing conditions: as for example by mixing a solution of calcium chlorid with a solution containing sodium carbonate, together with some sodium bicarbonate. In this case the sodium carbonates yield by reaction calcium carbonate, together with free carbon dioxid which is the converting agent, sufficient time being allowed for the conversion. Similarly, a good grade of barium sulfate may be prepared by adding a solution of barium chlorid to an excess of concentrated sulfuric acid, and permitting the mixture to stand until the bulk of the minute crystals which may have been initially formed have disappeared, with a corresponding increase in the average size of the remaining crystals.

It is not essential to the practice of the invention that the treatment should be continued until the minute crystals have entirely disappeared, it being necessary only that their number should be so reduced that the resulting product exhibits the characteristic dull-finish effect when applied to paper.

I claim:—

1. The method of converting a glossy-finish coating material into a dull-finish material consisting essentially of minute particles of varying size of like chemical constitution, which consists in subjecting the former to the action of a liquid having a limited solvent effect thereon, and continuing the action until the said conversion is completed.

2. The method of preparing a dull-finish coating material from inferior grades of barium sulfate, which consists in subjecting the latter to the action of a liquid having a limited solvent effect thereon, and continuing the action until the conversion is completed.

3. The method of preparing a dull-finish coating material from inferior grades of barium sulfate, which consists in subjecting the latter to the action of concentrated sulfuric acid until conversion is effected.

4. The method of preparing a dull-finish coating material from inferior grades of barium sulfate, which consists in subjecting the latter to the action of concentrated sulfuric acid until conversion is effected, then diluting the acid solution and recovering the converted product.

5. The method of preparing a dull-finish coating material from inferior grades of barium sulfate, which consists in subjecting the latter to the action of concentrated sulfuric acid until conversion is effected, then gradually diluting the acid solution and recovering the converted product.

In testimony whereof I affix my signature in presence of two witnesses.

RALPH H. McKEE.

Witnesses:
PATRICK H. HOULIHAN,
F. L. MORRIS.

Corrections in Letters Patent No. 1,216,338.

It is hereby certified that in Letters Patent No. 1,216,338, granted February 20, 1917, upon the application of Ralph H. McKee, of Orono, Maine, for an improvement in "Preparation of Dull-Finish Coating Materials," errors appear in the printed specification requiring correction as follows: Page 2, line 52, claim 1, after the word "material" insert the words *consisting essentially of minute particles of varying size;* same page and claim, lines 53-54, strike out the words "consisting essentially of minute particles of varying size"; and that the said Letters Patent should be read with these corrections therein that the same may conform to the record of the case in the Patent Office.

Signed and sealed this 20th day of March, A. D., 1917.

[SEAL.]     F. W. H. CLAY,

Cl. 134—58.     *Acting Commissioner of Patents.*